(12) United States Patent
Jacoby et al.

(10) Patent No.: US 7,698,489 B1
(45) Date of Patent: Apr. 13, 2010

(54) METHOD FOR DYNAMICALLY TURNING OFF BUS SIGNALS INTO A GPU

(75) Inventors: Rambod Jacoby, San Jose, CA (US); Charles Buffington, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 81 days.

(21) Appl. No.: 12/025,704

(22) Filed: Feb. 4, 2008

(51) Int. Cl.
 *G06F 13/00* (2006.01)
 *G06F 1/00* (2006.01)
 *H05K 7/10* (2006.01)

(52) U.S. Cl. .................. 710/301; 710/104; 710/302; 713/323; 713/324

(58) Field of Classification Search .................. 710/302, 710/104, 301; 713/323, 324
See application file for complete search history.

(56) References Cited

U.S. PATENT DOCUMENTS

| 6,985,152 B2 * | 1/2006 | Rubinstein et al. .......... 345/520 |
| 7,136,953 B1 * | 11/2006 | Bisson et al. ................ 710/307 |

\* cited by examiner

*Primary Examiner*—Mark Rinehart
*Assistant Examiner*—Jeremy S Cerullo
(74) *Attorney, Agent, or Firm*—Patterson & Sheridan, LLP

(57) ABSTRACT

Embodiments of the present disclosure provide techniques for dynamically turning off bus signals driven into a graphics processing unit (GPU) when the GPU is in a low power state. The GPU may be located on a graphics card mounted to a motherboard by a bus, such as a PCI-Express bus.

15 Claims, 6 Drawing Sheets

METHOD FOR DYNAMICALLY TURNING OFF BUS SIGNALS INTO A GPU

TECHNICAL FIELD

Certain embodiments of the present disclosure generally relate to graphics processing.

BACKGROUND

Desktop and portable computer systems often include graphics processing capabilities, for example, with a graphics processing unit (GPU) built into a motherboard chipset. Often, however, such systems allow for upgrades through the addition of a graphics card that typically has a GPU with more powerful processing capabilities than the motherboard GPU.

Drivers are available to offload graphics processing tasks to the graphics card GPU, when present. In a typical system, as long as the graphics card is installed, it will be powered on and functioning even in the absence of a graphics processing load that would gain significant benefit by offloading to the graphics card for processing.

Unfortunately, due to the high number of gates and high speed operation of complex GPUs, graphics cards consume a significant amount of power and generate a significant amount of heat. Further, to help manage the heat, graphics cards often have thermal solutions (e.g., relatively powerful fans) that generate a significant amount of noise.

While simply powering off a graphics card would reduce power consumption, heat and noise generation, relative long boot processes required on power up (e.g., when a complex graphics processing load is present) make this solution unattractive. Further, certain functionality of the graphics card (such as display detection) might also be lost if the entire card was powered down.

Therefore, solutions are needed that would help reduce the significant amount of power consumption, heat, and/or noise generated by graphics cards without unreasonable sacrifices in performance and/or functionality.

SUMMARY

Embodiments provide a technique and apparatus for dynamically controlling one or more signals driven into a graphics processing unit (GPU) on a bus connecting a card containing the GPU to a motherboard. The technique generally includes detecting, by a microcontroller on the graphics card, a low power state of the GPU, and manipulating, by the microcontroller, one or more signals on the bus to signal one or more components on the motherboard to stop driving one or more signals on the bus into the GPU.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Embodiments of the present disclosure provide techniques for dynamically turning off bus signals driven into a graphics processing unit (GPU) when the GPU is in a low power state. The GPU may be located on a graphics card mounted to a motherboard by a bus, such as a PCI-Express bus.

By manipulating certain signals of the bus, an embedded microcontroller on the graphics card may signal the motherboard when the GPU is about to enter a low power state. In response to the manipulated bus signals, the motherboard may place certain signal lines in a high impedance state, such as a reference clock signal line driven into the GPU during normal operation.

By maintaining power to the microcontroller on the graphics card, the microcontroller may also manipulate the bus signals to signal the GPU is about to exit the low power state, thereby prompting the motherboard to begin driving the bus signals again.

The techniques provided in the present disclosure may be utilized in a variety of systems that utilize graphics card including desktop computers, portable computers, gaming systems, and the like.

An Example System

Figure 1:
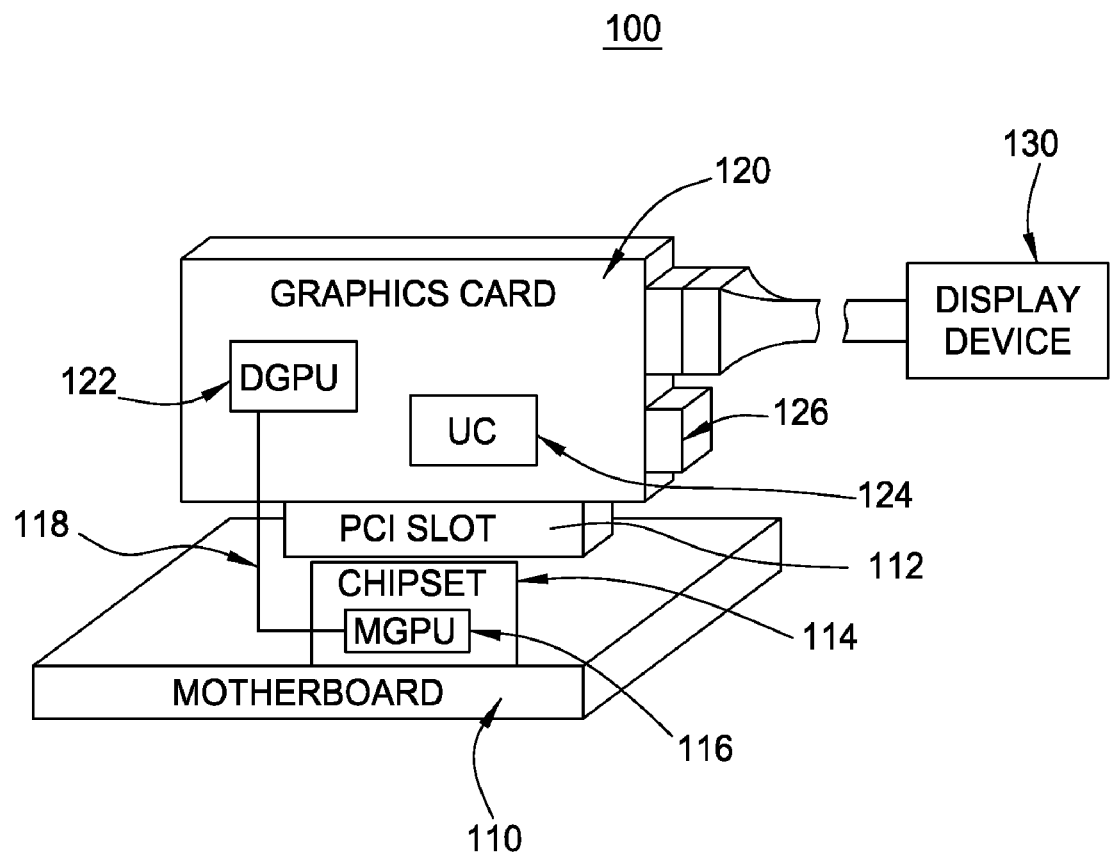
FIG. 1 illustrates an example system in accordance with certain embodiments of the present disclosure.

FIG. 1 illustrates an example system 100 in which embodiments of the present disclosure may be utilized. The system 100 generally includes a motherboard 110 with a card slot 112 to receive a graphics card 120. For example, the card slot 112 may be a PCI-Express card slot allowing a PCI-Express compatible graphics card to be mounted on the motherboard.

The motherboard may include a chipset 114 including, for example, a motherboard GPU (mGPU) 116. The chipset 114 may also include a central processing unit (CPU) which may be separate from an mGPU or the mGPU may be integrated in a single package with the CPU.

As illustrated, the graphics card 120 may include a discrete GPU 122. The dGPU 122 may be designed with substantially more graphics processing power than the mGPU 116, often serving to upgrade the overall graphics processing capabilities of the system 100. Scene data requiring intensive graphics processing, such as realistic 3-D graphics in video games, may be offloaded to the dGPU 122 for processing.

The motherboard chipset 114 may offload graphics data to the dGPU 122 via a bus 118, which may be any suitable type bus. For some embodiments, the bus 118 may be a PCI-Express bus. Accordingly, the card slot 112 may be a PCI-Express card slot and the graphics card 120 may be PCI-Express compatible.

As described above, due to the complexity and speed of operation, the dGPU 122 may consume a substantial amount of power and generate a substantial amount of heat. Often the graphics card 120 will include some type of thermal solution including, for example, relatively powerful fans allowing the dGPU 122 to be cooled by convection. These fans may contribute significantly to the overall noise generated by system 100.

In some cases, it may be desirable to reduce the overall power consumption and noise generated by the graphics card 120 by powering down the dGPU 122 on occasion. For example, the dGPU may be powered down when the system 100 is running applications where the graphics processing capabilities of the mGPU 116 are sufficient.

For some embodiments, the graphics card 120 may include logic for coordinating power down of the dGPU 122 and/or corresponding thermal solutions when the graphics card 120 is placed in a low power state. For example, the graphic card 120 may include a microcontroller 124 (or other type of processor) that coordinates powering down components to place the graphics card 120 in a low power state. The microcontroller 124 may, for example, control one or more regulators that supply voltage to the dGPU 122 and/or thermal solutions.

Dynamically Turning Off Bus Signals into a GPU

When the graphics card 120 is powered down, there may be unnecessary power consumption if the motherboard continues to drive bus signals into the dGPU 122. Further, depending on the particular design of the dGPU 122, there may be a risk of damage to the dGPU circuitry if signals are applied while the device is powered down.

Therefore, certain embodiments of the present invention allow bus signals driven into the dGPU during normal operation to be dynamically disabled when the dGPU is in a low power state. For some embodiments, the microcontroller 124 may manipulate one or more bus signals in order to notify the motherboard chipset 114 the dGPU is about to enter the low power state.

In response to these manipulated signals, the motherboard chipset may disable certain bus signals driven into the dGPU, for example, by ceasing to drive the signals and placing the signal lines in a high impedance state. For some embodiments, existing bus signals, such as PCI-Express signals may be used to signal the motherboard chipset the dGPU is entering/exiting a low power state. For some embodiments, rather than manipulate existing bus signals, dedicated signal lines may be created for the purpose of signaling the motherboard chipset the dGPU is entering/exiting a low power state.

Figure 2:
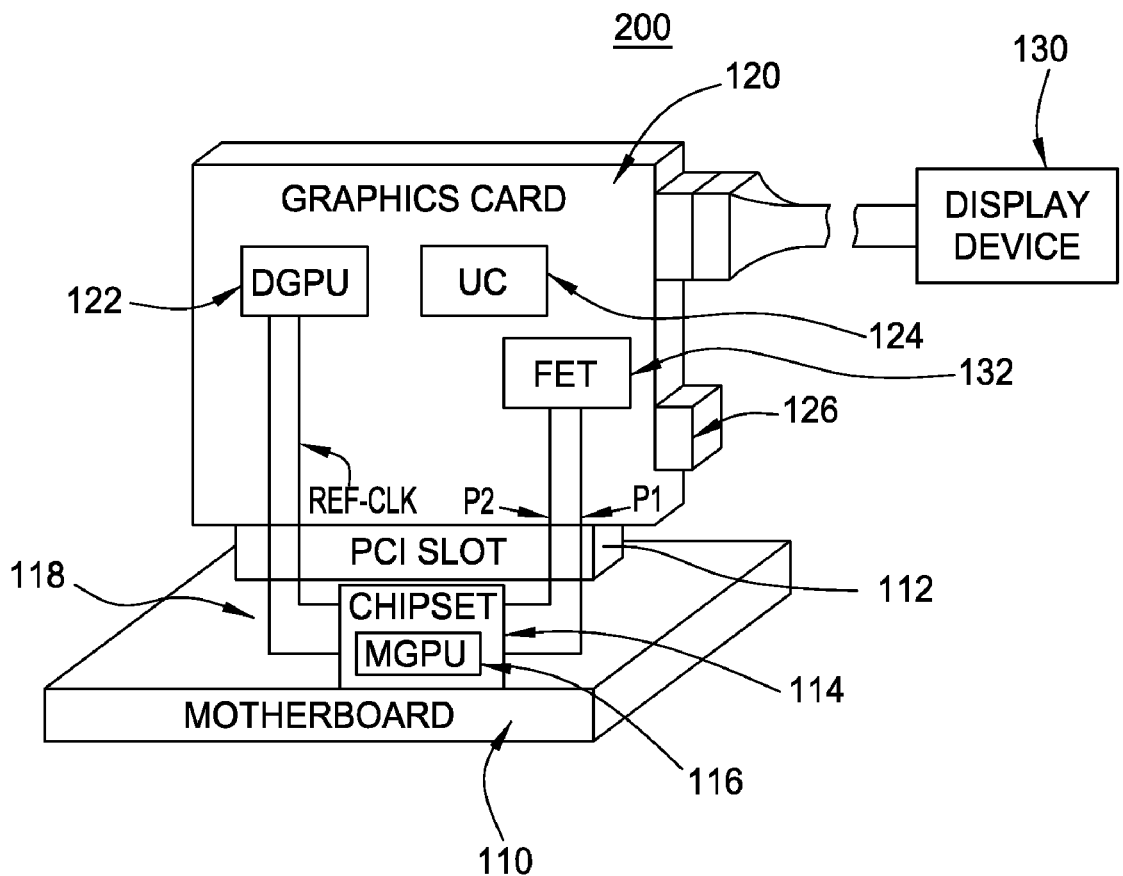
FIG. 2 illustrates an example system in accordance with certain embodiments of the present disclosure.

As illustrated in FIG. 2, for some embodiments, the graphics card 120 may include a switching device, such as FET 132, in order to manipulate the state of one or more PCI-Express bus signals. The microcontroller may control the FET 132 in order to generate a sequence of signals that notifies the motherboard chipset the dGPU is about to enter a low power state. In response, the motherboard chipset may disable one or more of the bus signals driven into the dGPU.

Figure 3:
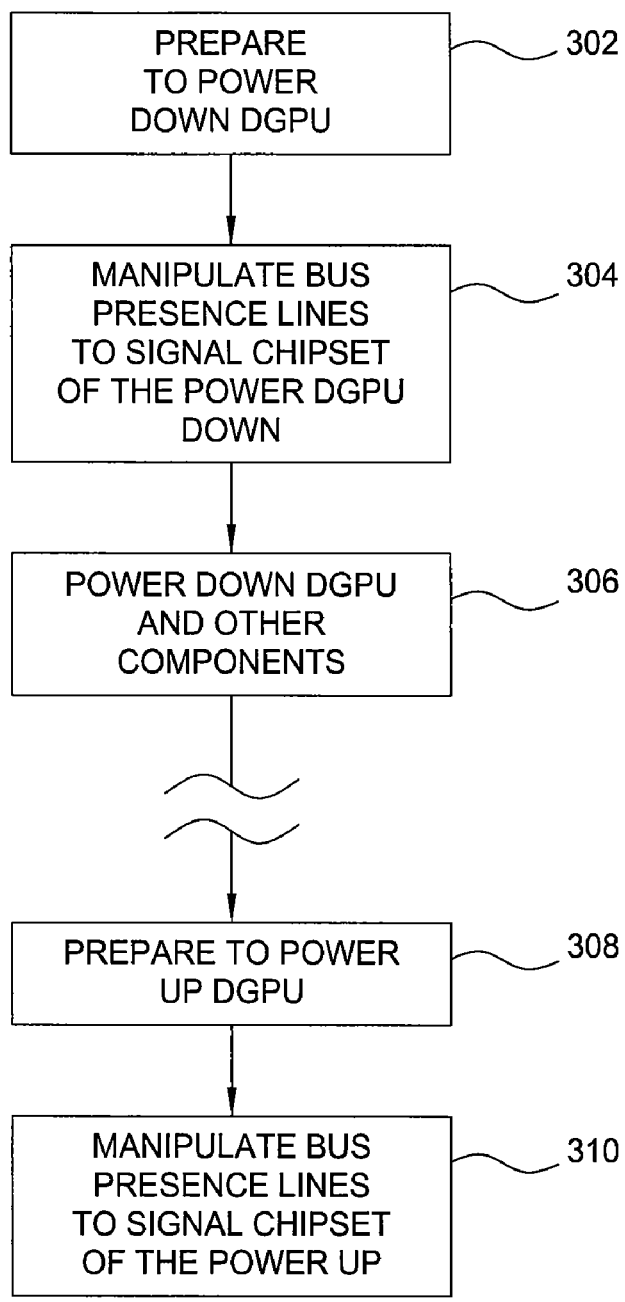
FIG. 3 is a flow diagram of example operations for identifying a display without powering on a GPU connected to the display in accordance with certain embodiments of the present disclosure.

FIG. 3 illustrates a flow diagram of example operations 300 that may be performed, for example, by the microcontroller 124, in order to notify the motherboard chipset the dGPU is about to enter and/or exit a low power state. The operations 300 may be understood with reference to FIG. 4 which illustrates a timing diagram of example signals that may change state in accordance with the operations 300.

The operations begin, at 302, by preparing to power down a graphics card GPU. As previously described, for some embodiments, the microcontroller may help coordinate powering down the dGPU. For other embodiments, the dGPU may be power down without involvement by the microcontroller. In the latter case, the microcontroller may at least become aware that the dGPU has been powered down or is about to be powered down.

At 304, the microcontroller manipulates the bus lines to signal the motherboard chipset of the dGPU power down. At 306, the dGPU and other components (e.g., thermal solution) are powered down. For some embodiments, the microcontroller 124 may actually control the powering down of components, for example, manipulating voltage regulator outputs to these components. Upon exiting the power down state, at 308, the bus lines may again be manipulated, at 310, to signal the chipset to again begin driving the bus signals into the dGPU.

Exactly what signals the microcontroller manipulates and exactly how those signals are manipulated may vary depending on the particular embodiment. For some embodiments, the microcontroller may manipulate "PRESENT" signals that are used to detect the presence of PCI-Express devices. For example, a bus trace for one of the Presence signals may be connected to ground, while another is pulled up to a voltage corresponding to a high logic level through a pull-up resistor. By physically connecting these two lines together on a PCI-Express card, the motherboard chipset may be able to detect when the PCI-Express card is present (plugged in) or not (removed).

For some embodiments, the microcontroller may manipulate PCI-Express presence signals in this manner. For some embodiments, specific PCI-Express signals driven into the dGPU, such as a PCI Express Reference Clock (REF_CLK), may be disabled during a low power state where the dGPU is powered off.

Figure 4:
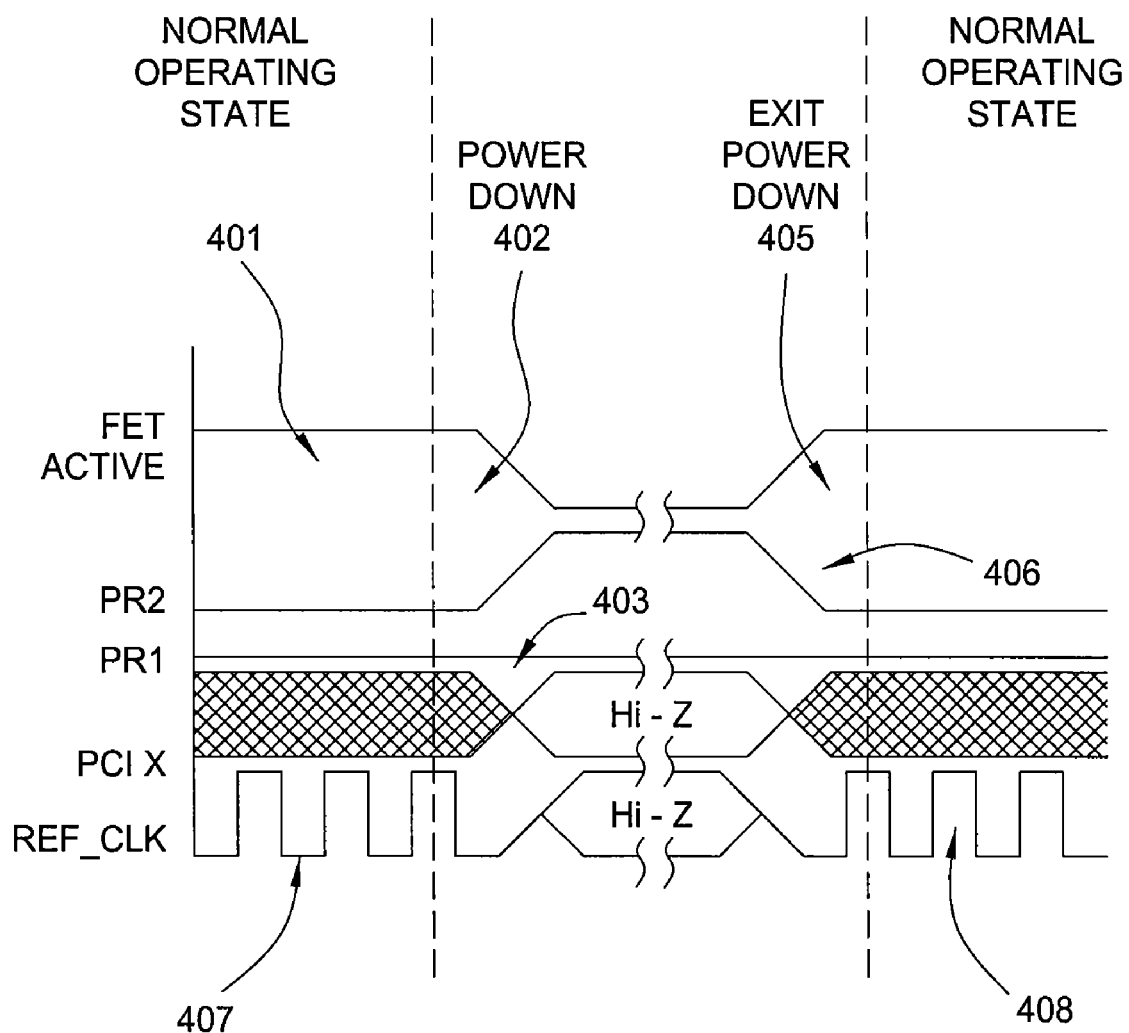
FIG. 4 is a timing diagram that illustrates placing certain bus signals in a high impedance state when a graphics card is in a low power state.

FIG. 4 is a timing diagram showing example signal timing for such an embodiment. The timing diagram illustrates general PCI-Express bus signals that are driven into the dGPU by the motherboard chipset, as well as the specific PCI-Express reference clock. The timing diagram also the microcontroller signal to the FET that, in this example, connects the PCI-Express present signal lines (PRESENT1 and PRESENT2).

FIG. 4 is a timing diagram showing example signal timing for such an embodiment. The timing diagram illustrates general PCI-Express bus signals that are driven into the dGPU by the motherboard chipset, as well as the specific PCI-Express reference clock. The timing diagram also includes the microcontroller signal to the FET that, in this example, connects the PCI-Express present signal lines (PRESENT1 and PRESENT2).

As illustrated at 401, in a normal operating condition, the FET is active (switched on), connecting the PRESENT1 and PRESENT2 signal lines. As a result, on the motherboard, the PRESENT2 signal line (connected to a pull-up resistor) is pulled to ground through the connection to PRESENT1. While this conventionally signals the motherboard that a PCI-Express card is present, in the present application it may be taken as an indication that the dGPU is powered on. Thus, the PCI-Express signals, including the reference clock are driven into the GPU, as shown at 407.

To signal a power down state of the dGPU, the microcontroller may de-activate the FET as shown at 402, disconnecting the PRESENT1 and PRESENT2 signal lines. As a result, on the motherboard, the PRESENT2 signal line is pulled up through the pull-up resistor. While this conventionally signals the motherboard that a PCI-Express card is not present (or has been removed), in the present application it may be taken as an indication that the dGPU is powered down (or will be powered down). Thus, the PCI-Express signals driven into the GPU, including the reference clock signal, are disabled. As illustrated at 403, when disabled these signal lines may be placed in a high impedance (Hi-Z) state, thereby minimizing power consumption.

As illustrated at 405, upon exiting the power down state, the microcontroller may again switch on the FET to signal the motherboard chipset. By again connecting the PRESENT1 and PRESENT2 signal lines, the PRESENT2 signal line may again go low as shown at 406, signaling the motherboard to again drive the PCI-Express signals into the dGPU as shown at 408.

Figure 5A:
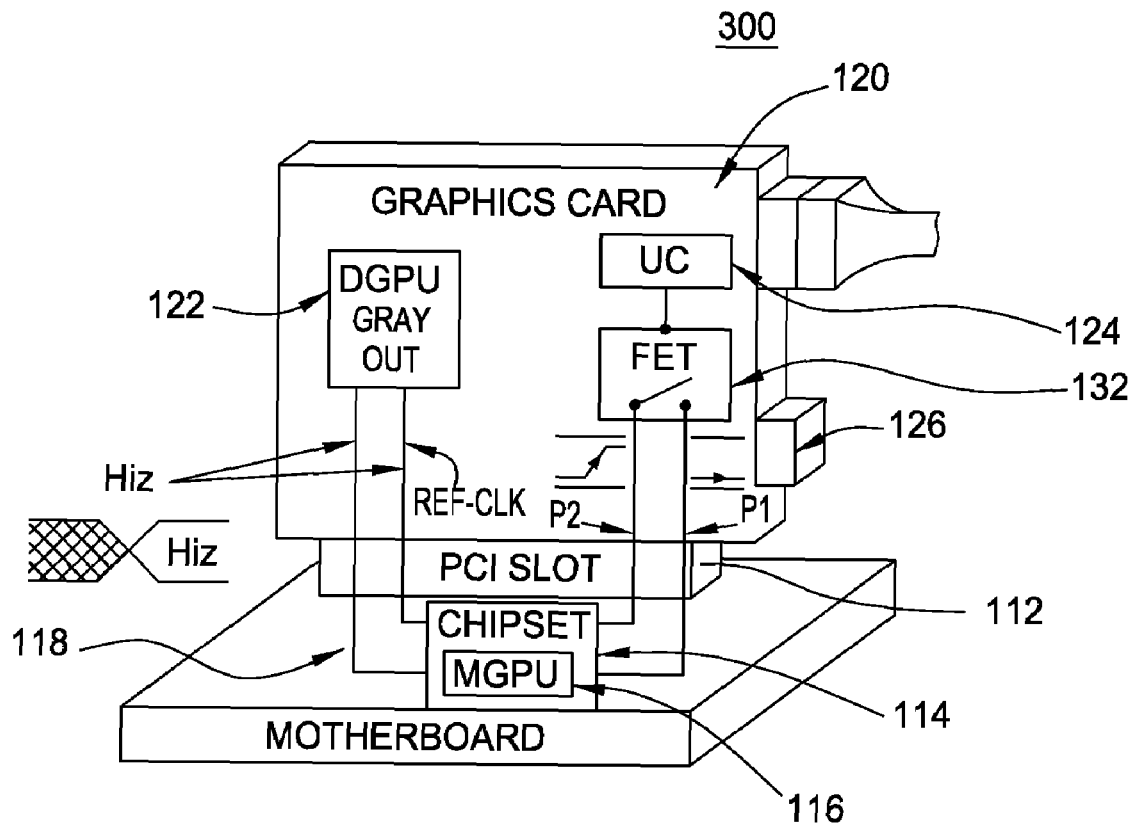
FIGS. 5A-5B illustrate states of a system when dynamically turning off bus signals in accordance with certain embodiments of the present disclosure.
Figure 5B:
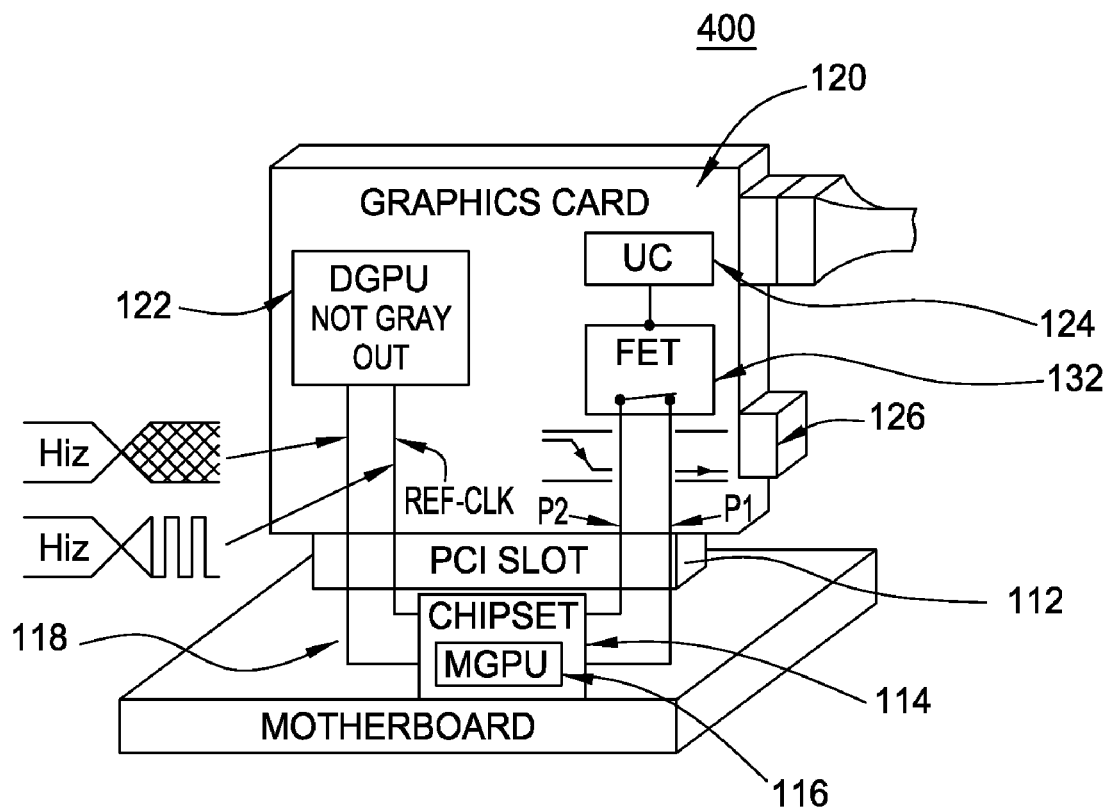

FIGS. 5A-5B illustrate the dynamic disabling/enabling of signals driven into the dGPU, corresponding to the operations described above. FIG. 5A depicts the graphics card in the low power state with the dGPU powered down. As illustrated, the microcontroller controls the FET to (effectively open a switch) disconnect the PRESENT1 and PRESENT2 signal lines. In response, the motherboard chipset places the PCI-Express signals driven into the dGPU into a high impedance state.

FIG. 5B depicts the graphics card in normal operating state (having exited the low power state) with the dGPU powered on. As illustrated, the microcontroller controls the FET to (effectively close the switch) connecting the PRESENT1 and PRESENT2 signal lines. In response, the motherboard chipset drives the PCI-Express signals into the dGPU.

For some embodiments, the motherboard may include memory with drivers specific to the graphics card that helps enable some of the functionality discussed herein. For example, such drivers may include software instructions (executable code) that determines exactly what type of signal manipulation the motherboard is expecting as an indication the graphics card is entering/exiting a power down state.

Such drivers may also dictate a number of other actions, such as exactly what bus signals are disabled and in what sequence. For example, while embodiments described above utilized a relatively simple mechanism for the graphics card to notify the motherboard chipset that a power down state is being entered or exited, more complicated sequences may be utilized to signal different types of power down states. For example, there may be power down states where different portions of the dGPU are powered down and different sets of bus signals are disabled accordingly.

The microcontroller may also perform more elaborate signaling actions that may be interpreted by the motherboard chipset. For example, the microcontroller may pulse the FET alternately connecting and disconnecting the PRESENT1 and PRESENT2 signal lines. The number and/or frequency of these pulses may be varied to signal the motherboard chipset of different types of power down states.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for dynamically controlling one or more signals driven into a graphics processing unit (GPU) on a bus connecting a graphics card containing the GPU to a motherboard, comprising:
   detecting, by a microcontroller on the graphics card, a low power state of the GPU; and
   manipulating, by the microcontroller, one or more signals on the bus to signal one or more components on the motherboard to stop driving one or more signals on the bus into the GPU.

2. The method of claim 1, wherein:
   manipulating, by the microcontroller, one or more signals on the bus comprises controlling a transistor to electrically connect two signal lines of the bus on the graphics card.

3. The method of claim 2, wherein the two signal lines comprise PCI-Express presence signal lines.

4. The method of claim 1, wherein manipulating the one or more signals comprises alternately connecting and disconnecting the signal lines to identify different types of low power states.

5. The method of claim 1, further comprising:
   detecting, by the microcontroller on the graphics card, an exit of the low power state of the GPU; and
   manipulating, by the microcontroller, one or more signals on the bus to signal one or more components on the motherboard to resume driving one or more signals on the bus into the GPU.

6. A graphics card, comprising:
   a graphics processing unit (GPU); and
   a microcontroller, the microcontroller detecting a low power state of the GPU;
   wherein the graphics card is configured to manipulate one or more signals on a bus to signal one or more components on a motherboard to stop driving one or more signals on the bus into the GPU, when the microcontroller detects a low power state of the GPU.

7. The graphics card of claim 6, further comprising:
   a transistor, the transistor electrically connecting two signal lines of the bus on the graphics card, when the microcontroller detects a low power state of the GPU.

8. The graphics card of claim 7, wherein the two signal lines comprise PCI-Express presence signal lines.

9. The graphics card of claim 6, wherein the graphics card is further configured to manipulate the one or more signals by alternately connecting and disconnecting the signal lines to identify different types of low power states.

10. The graphics card of claim 6, wherein:
    the microcontroller on the graphics card further detects an exit of the low power state of the GPU; and
    the graphics card is further configured to manipulate one or more signals on the bus to signal one or more components on the motherboard to resume driving one or more signals on the bus into the GPU.

11. A system, comprising:
a motherboard;
a bus on the motherboard; and
a graphics card connected to the motherboard via the bus, the graphics card comprising:
  a graphics processing unit (GPU); and
  a microcontroller, the microcontroller detecting a low power state of the GPU;
wherein the graphics card is configured to manipulate one or more signals on the bus to signal one or more components on the motherboard to stop driving one or more signals on the bus into the GPU, when the microcontroller detects a low power state of the GPU.

12. The system of claim 11, wherein the graphics card further comprises:
  a transistor, the transistor electrically connecting two signal lines of the bus on the graphics card, when the microcontroller detects a low power state of the GPU.

13. The system of claim 12, wherein the two signal lines comprise PCI-Express presence signal lines.

14. The system of claim 11, wherein the graphics card is further configured to manipulate the one or more signals by alternately connecting and disconnecting the signal lines to identify different types of low power states.

15. The system of claim 11, wherein:
  the microcontroller on the graphics card further detects an exit of the low power state of the GPU; and
  the graphics card is further configured to manipulate one or more signals on the bus to signal one or more components on the motherboard to resume driving one or more signals on the bus into the GPU.

* * * * *